(12) United States Patent
Tanaka et al.

(10) Patent No.: US 9,086,133 B2
(45) Date of Patent: Jul. 21, 2015

(54) LUBRICATING STRUCTURE OF TRANSMISSION

(71) Applicant: HONDA MOTOR CO., LTD, Tokyo (JP)

(72) Inventors: Yoshinori Tanaka, Saitama (JP); Kazunori Miyata, Saitama (JP); Shoji Machida, Saitama (JP); Yasutaka Yano, Saitama (JP)

(73) Assignee: HONDA MOTOR CO., LTD, Tokyo (JP)

( * ) Notice: Subject to any disclaimer, the term of this patent is extended or adjusted under 35 U.S.C. 154(b) by 362 days.

(21) Appl. No.: 13/733,591

(22) Filed: Jan. 3, 2013

(65) Prior Publication Data

US 2013/0213740 A1  Aug. 22, 2013

(30) Foreign Application Priority Data

Feb. 17, 2012 (JP) .................................. 2012-033207

(51) Int. Cl.
*F16H 57/04* (2010.01)

(52) U.S. Cl.
CPC .......... *F16H 57/043* (2013.01); *F16H 57/0494* (2013.01)

(58) Field of Classification Search
CPC .. F16H 57/043; F16H 57/0494; A01B 12/006
USPC ......................................................... 184/6.12
See application file for complete search history.

(56) References Cited

U.S. PATENT DOCUMENTS

| 5,921,349 A | * | 7/1999 | Sato et al. ..................... 184/6.14 |
| 7,065,954 B2 | * | 6/2006 | Labala ........................ 60/39.465 |
| 8,443,941 B2 | * | 5/2013 | McDonald et al. .......... 184/6.26 |

FOREIGN PATENT DOCUMENTS

| EP | 0448457 A1 | 9/1991 |
| JP | 2007-024234 A | 2/2007 |

OTHER PUBLICATIONS

Office Action dated Mar. 2, 2015, issued in corresponding Chinese Application No. 201310026382.0 (5 pages).

* cited by examiner

*Primary Examiner* — William E Dondero
*Assistant Examiner* — Mark K Buse
(74) *Attorney, Agent, or Firm* — Westerman, Hattori, Daniels & Adrian, LLP

(57) ABSTRACT

A lubricating structure of a transmission is capable of supplying more lubricating oil to the vicinity of one end portion of a shaft, which rotates in a transmission, than lubricating oil supplied to the remaining mechanisms of the transmission. An internal space of the shaft rotating in the transmission has a pipe inserted thereto with a gap provided therebetween, a large-diameter portion having two shaft lubrication holes, a stepped portion, and a small-diameter portion having a shaft lubrication hole. The pipe has a first pipe lubrication hole in communication with the gap and a second pipe lubrication hole in communication with the small-diameter portion.

4 Claims, 4 Drawing Sheets

LUBRICATING STRUCTURE OF TRANSMISSION

BACKGROUND OF THE INVENTION

1. Field of the Invention

The present invention relates to a lubricating structure of a transmission adapted to supply lubricating oil to an area around a shaft, which rotates in a transmission, through an internal space of the shaft.

2. Description of the Related Art

There has conventionally been known a transmission adapted to supply lubricating oil from an oil passage provided in a case of the transmission to an oil passage in a shaft, which rotates in the transmission and to distribute the lubricating oil to a clutch, a synchronization mechanism and the like through a plurality of lubrication holes provided in the shaft.

For example, Japanese Patent Application Laid-Open No. 2007-24234 discloses a lubricating device proposed to correct the imbalance of lubricating oil in a transmission. In the lubricating device, a pipe is inserted from one end into an oil passage in the shaft over the full length of the oil passage, and the pipe is provided with a plurality of lubrication holes that penetrate from the inner peripheral surface of the pipe to the outer peripheral surface thereof.

The lubricating oil supplied to the one end in the pipe flows out of each lubricating hole in the pipe to be distributed to an area around the shaft through each corresponding lubricating hole in the shaft. This arrangement corrects an imbalanced distribution amount of the lubricating oil in the lengthwise direction of the shaft regardless of the rotational speed of the shaft.

However, there are some cases where supplying an even distribution amount of lubricating oil over the full length of a shaft is not appropriate. For example, in the case of a transmission having a clutch, which requires abundant lubricating oil, disposed in the vicinity of one end of a shaft to which the lubricating oil is supplied, it is necessary to supply more lubricating oil to the vicinity of the one end of the shaft than that supplied to the remaining mechanisms.

SUMMARY OF THE INVENTION

In view of the limitation now present in the prior art, an object of the present invention is to provide a lubricating structure of a transmission that is capable of supplying more lubricating oil to the vicinity of one end portion of a shaft, which rotates in a transmission, than lubricating oil supplied to the remaining portion.

A lubricating structure of a transmission in accordance with the present invention includes: a shaft which rotates in a transmission; and a pipe which has a proximal end portion thereof secured to a case of the transmission and through which lubricating oil is supplied from the proximal end, wherein the shaft has an internal space that extends along a rotational axis line thereof, the internal space has a large-diameter portion of a predetermined diameter that opens at one end of the shaft, a small-diameter portion having a diameter which is smaller than that of the large-diameter portion, and a stepped portion between the large-diameter portion and the small-diameter portion, the pipe is inserted into the large-diameter portion such that a predetermined gap is formed between the pipe and an internal peripheral surface of the large-diameter portion, the shaft has a first shaft lubrication hole penetrating from the large-diameter portion to an outer peripheral surface of the shaft and a second shaft lubrication hole penetrating from the small-diameter portion to the outer peripheral surface of the shaft, the pipe has a first pipe lubrication hole penetrating from an inner peripheral surface thereof to the gap, a distal end of the pipe has a second pipe lubrication hole of a diameter which is smaller than the diameter of the first pipe lubrication hole, and a passage from the gap to the small-diameter portion is narrowed by a distal end portion of the pipe and the stepped portion.

In this configuration, the lubricating oil supplied from the proximal end into the pipe flows through the first pipe lubrication hole into the gap between the pipe and the inner peripheral surface of the large-diameter portion and also flows through the second pipe lubrication hole into the small-diameter portion. The lubricating oil that has flown into the gap rotates due to the friction against the inner surface of a rotating large-diameter portion, causing a centrifugal force to act on the lubricating oil. The lubricating oil subjected to the centrifugal force successfully flows out through the first shaft lubrication hole to be distributed to the mechanisms around the shaft.

At this time, the movement of the lubricating oil flown out to the gap, being subjected to the centrifugal force, is restricted in an axial direction by the stepped portion, and the passage to the small-diameter portion is narrowed by the distal end portion of the pipe and the stepped portion. Hence, the movement of the lubricating oil toward the small-diameter portion is restricted to a certain extent, so that the lubricating oil temporarily becomes stagnant. While the lubricating oil remains stagnant, the centrifugal force acting on the lubricating oil further increases, thus accelerating the outflow of the lubricating oil through the first pipe lubrication hole.

The lubricating oil that has not flown out of the first pipe lubrication hole passes between the inner wall of the stepped portion and the distal end portion of the pipe and flows into the small-diameter portion. The lubricating oil flown into the small-diameter portion merges with the lubricating oil that has flown into the small-diameter portion through the second pipe lubrication hole. The merged lubricating oil is subjected to the centrifugal force generated by the rotation of the shaft and flows out of the second shaft lubrication hole to be distributed to corresponding mechanisms around the shaft.

At this time, the diameter of the second pipe lubrication hole is smaller than the diameter of the first pipe lubrication hole, so that the amount of the lubricating oil flowing into the small-diameter portion through the second pipe lubrication hole is relatively small. In addition, since the small-diameter portion has a diameter which is smaller than that of the large-diameter portion, so that the centrifugal force acting on the lubricating oil in the small-diameter portion is smaller than that in the case of the large-diameter portion.

Hence, the amount of the lubricating oil to be distributed through the first shaft lubrication hole from the large-diameter portion can be easily increased to be more than the amount of the lubricating oil to be distributed through the second shaft lubrication hole. Further, the ratio between the amount of supply through the first shaft lubrication hole and that through the second shaft lubrication hole can be properly set by selecting the dimensions of the second pipe lubrication hole, the stepped portion and the like. Thus, more lubricating oil of an appropriate amount can be supplied to the vicinity of the end portion, where the large-diameter portion of the shaft is located, than the lubricating oil supplied to the remaining portion, over which the small-diameter portion extends.

In the present invention, a distal end portion of the pipe has a tapered portion having a diameter thereof reduced toward the distal end. A range over which the stepped portion and the tapered portion are present may be overlapped in the axial line direction. This arrangement enables the stepped portion and the tapered portion to accurately narrow the passage from the aforesaid gap to the small-diameter portion.

In the present invention, the first shaft lubrication hole may be constituted of a lubrication hole located at a position corresponding to the first pipe lubrication hole and the lubrication hole located closer to the stepped portion than the lubrication hole.

With this arrangement, the lubricating oil that has entered the aforesaid gap through the first pipe lubrication hole and has not flown out of the lubrication hole located at the position corresponding to the first pipe lubrication hole rotates due to the friction against the inner peripheral surface of the large-diameter portion, being ideally subjected to a centrifugal force, until the lubricating oil reaches the lubrication hole adjacent to the stepped portion. This allows the lubricating oil to successfully flow out of the shaft through the lubrication hole adjacent to the stepped portion. Thus, the amount of the lubricating oil to be distributed through the first shaft lubrication hole can be effectively increased.

Further, in the present invention, the first shaft lubrication hole may be provided to supply lubricating oil to the clutch of the transmission and a distal end of the second pipe lubrication hole may be located in the small-diameter portion.

With this arrangement, the lubricating oil is supplied to the clutch of the transmission through the first shaft lubrication hole, thus making it possible to distribute more lubricating oil than the lubricating oil distributed to the remaining portion through the second shaft lubrication hole from the small-diameter portion. Moreover, since the distal end of the second pipe lubrication hole is positioned in the small-diameter portion, the lubricating oil can be securely supplied into the small-diameter portion from the distal end of the second pipe lubrication hole.

DESCRIPTION OF THE PREFERRED EMBODIMENTS

Figure 1:
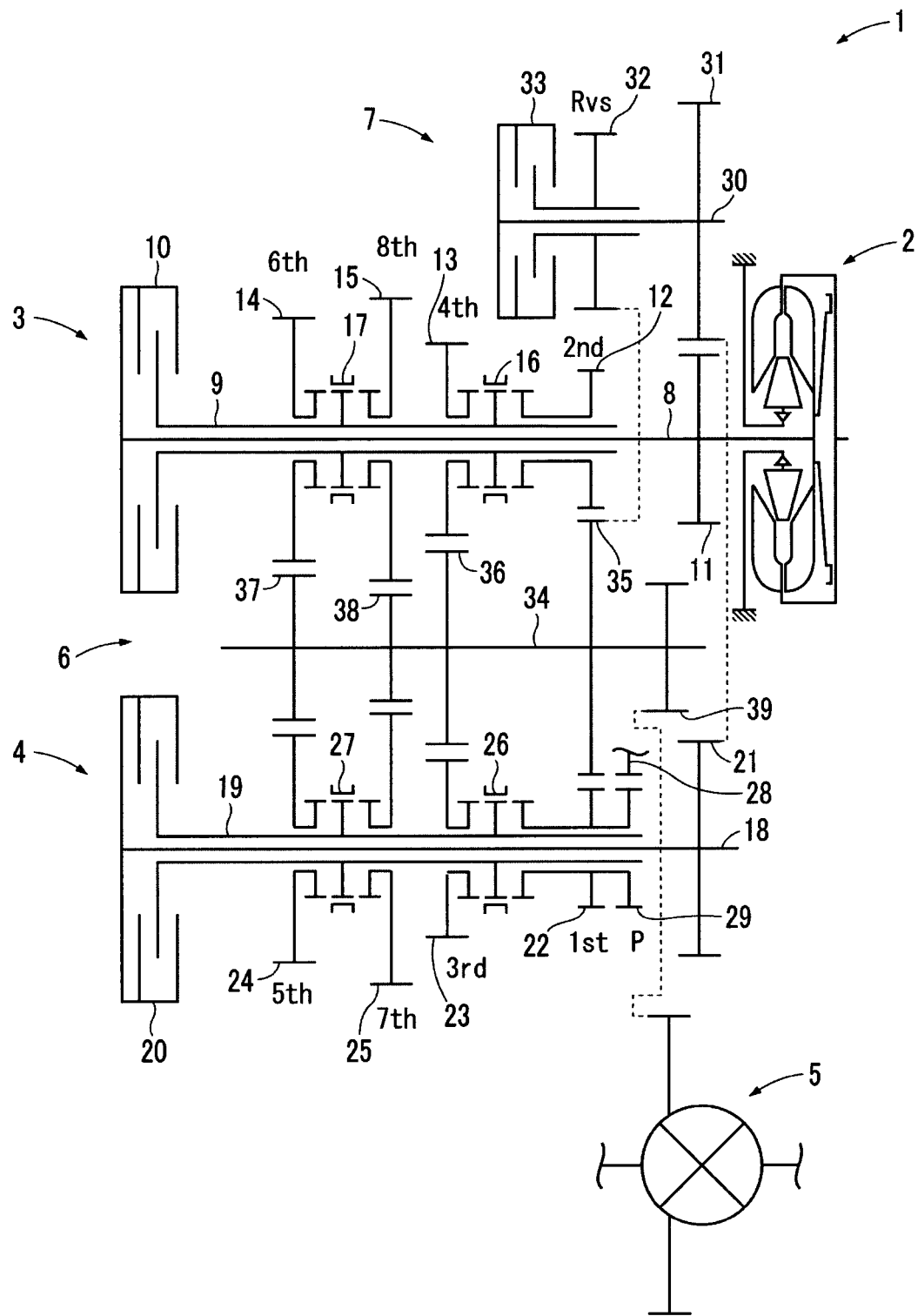
FIG. 1 is a skeleton diagram of a transmission according to an embodiment of the present invention.

The following will describe an embodiment of the present invention with reference to the accompanying drawings. As illustrated in FIG. 1, a transmission 1 to which the lubricating structure according to an embodiment of the present invention is a twin clutch type transmission which uses two clutches for shifting odd-numbered stages and even-numbered stages.

The transmission 1 has a torque converter 2 for transmitting motive power input from an outside source through the intermediary of a fluid, an even-numbered stage speed changer 3 which shifts the motive power from the torque converter 2 to an even-numbered stage, an odd-numbered stage speed changer 4 which shifts the motive power from the torque converter 2 to an odd-numbered stage, an output section 6 which outputs the motive power from each gear shift stage received from the even-numbered stage speed changer 3 and the odd-numbered stage speed changer 4 to a differential gear 5, and a reverse speed changer 7 which shifts the motive power from the torque converter 2 to a reverse power.

The even-numbered stage speed changer 3 has a first input shaft 8 connected to the output side of the torque converter 2, a first auxiliary input shaft 9 rotatably supported by the first input shaft 8 on a coaxial line, and a first clutch 10 capable of switching between an engagement mode, in which the motive power of the first input shaft 8 is transmitted to the first auxiliary input shaft 9, and a disengagement mode, in which the transmission is shut off. The first clutch 10 is positioned at an end opposite from the torque converter 2 of the first input shaft 8 and the first auxiliary input shaft 9.

The first input shaft 8 is provided with an idle drive gear 11 for transmitting motive power to the reverse speed changer 7 and the odd-numbered stage speed changer 4. The first auxiliary input shaft 9 is provided with a 2nd-speed drive gear 12, a 4th-speed drive gear 13, a 6th-speed drive gear 14, and an 8th-speed drive gear 15 for transmitting the motive power related to even-numbered gear shift stages of a 2nd speed, a 4th speed, a 6th speed, and an 8th speed, respectively.

The first auxiliary input shaft 9 is further provided with a 2nd-4th speed synchromesh mechanism 16, which selectively connects the 2nd-speed drive gear 12 and the 4th-speed drive gear 13 to the first auxiliary input shaft 9, and a 6th-8th speed synchromesh mechanism 17, which selectively connects the 6th-speed drive gear 14 and the 8th-speed drive gear 15 to the first auxiliary input shaft 9.

The odd-numbered stage speed changer 4 is provided with a second input shaft 18 provided in parallel to the first input shaft 8, a second auxiliary input shaft 19 rotatably supported by the second input shaft 18 on the coaxial line, and a second clutch 20 capable of switching between the engagement mode, in which the motive power of the second input shaft 18 is transmitted to the second auxiliary input shaft 19, and the disengagement mode in which the transmission is shut off. The first clutch 10 and the second clutch 20 are wet type.

The second input shaft 18 is provided with an idle driven gear 21, and motive power is input thereto through the intermediary of the idle driven gear 21. The second auxiliary input shaft 19 is provided with a 1st-speed drive gear 22, a 3rd-speed drive gear 23, a 5th-speed drive gear 24, and a 7th-speed drive gear 25 for transmitting the motive power related to odd-numbered gear shift stages of a 1st speed, a 3rd speed, a 5th speed, and a 7th speed, respectively.

The second auxiliary input shaft 19 is further provided with a 1st-3rd speed synchromesh mechanism 26, which selectively connects the 1st-speed drive gear 22 and the 3rd-speed drive gear 23 to the second auxiliary input shaft 19, and a 5th-7th speed synchromesh mechanism 27, which selectively connects the 5th-speed drive gear 24 and the 7th-speed drive gear 25 to the second auxiliary input shaft 19. The second auxiliary input shaft 19 is further provided with a parking gear 29, which is secured to the 1st-speed drive gear 22 and meshes with a fixed gear 28 at the time of parking thereby to prevent the 1st-speed drive gear 22 from rotating.

The reverse speed changer 7 includes an idle shaft 30 provided in parallel to the first input shaft 8, an idle gear 31 secured to the idle shaft 30, a reverse gear 32 rotatably supported by the idle shaft 30 on a coaxial line, and a reverse clutch 33 capable of switching between the engagement mode, in which the motive power of the idle shaft 30 is transmitted to the reverse gear 32, and the disengagement mode, in which the transmission is shut off.

The idle gear 31 meshes with the idle drive gear 11 and the idle driven gear 21 to transmit the motive power of the idle drive gear 11 to the idle shaft 30 and the idle driven gear 21.

The reverse gear 32 transmits reverse motive power to the output section 6 at the time of moving backward.

The output section 6 includes an output shaft 34 provided in parallel to the first input shaft 8, a 1st speed/2nd speed/reverse driven gear 35, a 3rd speed/4th speed driven gear 36, a 5th speed/6th speed driven gear 37, a 7th speed/8th speed driven gear 38, and a last drive gear 39, which are secured to the output shaft 34. The 1st speed/2nd speed/reverse driven gear 35 meshes with the 1st-speed drive gear 22, the 2nd-speed drive gear 12, and the reverse gear 32 to transmit the motive power of these gears to the output shaft 34.

The 3rd speed/4th speed driven gear 36 meshes with the 3rd-speed drive gear 23 and the 4th-speed drive gear 13 to transmit the motive power of these gears to the output shaft 34. The 5th speed/6th speed driven gear 37 meshes with the 5th-speed drive gear 24 and the 6th-speed drive gear 14 to transmit the motive power of these gears to the output shaft 34. The 7th speed/8th-speed driven gear 38 meshes with the 7th-speed driven gear 25 and the 8th-speed drive gear 15 to transmit the motive power of these gears to the output shaft 34. The last drive gear 39 transmits the motive power, which has been transmitted to the output shaft 34, to the differential gear 5.

To establish the 1st speed in the transmission 1, the 1st-3rd speed synchromesh mechanism 26 connects the 1st-speed drive gear 22 to the second auxiliary input shaft 19 beforehand. Thereafter, when the accelerator pedal of a vehicle in which the transmission 1 has been installed is depressed, the second clutch 20 is set in the engagement mode. However, the first clutch 10 and the reverse clutch 33 remain in the disengagement mode.

As a result, the motive power to be transmitted to the first input shaft 8 through the intermediary of the torque converter 2 is transmitted to the differential gear 5 through the intermediary of the idle drive gear 11, the idle gear 31, the idle driven gear 21, the second input shaft 18, the second clutch 20, the second auxiliary input shaft 19, the 1st-3rd speed synchromesh mechanism 26, the 1st-speed drive gear 22, the 1st speed/2nd speed/reverse driven gear 35, the output shaft 34, and the last drive gear 39.

To switch between an odd-numbered stage and an even-numbered stage, one of the 1st-speed to the 8th-speed drive gears of either 12 to 15 or 22 to 25 to be used as the new gear shift stage is connected to the first auxiliary input shaft 9 or the second auxiliary input shaft 19 beforehand by the 1st-3rd speed synchromesh mechanism 26, the 2nd-4th speed synchromesh mechanism 16 or the 5th-7th speed synchromesh mechanism 27 or the 6th-8th speed synchromesh mechanism 17 that corresponds to the selected speed drive gear, and the selected speed drive gear is placed in a standby mode. Then, when a switching timing is reached, the switching between the engagement mode and the disengagement mode in the first clutch 10 and the second clutch 20 is carried out.

For example, to switch from the 1st speed to the 2nd speed, the 2nd-speed drive gear 12 is connected in advance to the first auxiliary input shaft 9 by the 2nd-4th speed synchromesh mechanism 16. Then, when the switching timing is reached, the second clutch 20 is switched from the engagement mode to the disengagement mode, while the first clutch 10 is switched from the disengagement mode to the engagement mode. This accomplishes the changeover to the 2nd speed, causing the motive power of the first input shaft 8 to be transmitted to the differential gear 5 through the intermediary of the 2nd-speed drive gear 12.

A reverse mode is established by setting the reverse clutch 33 to the engagement mode. A parking mode is established by setting the parking gear 29 and the fixed gear 28 in an engaged state.

Thus, in the transmission 1, a speed change is accomplished by setting an even-numbered stage or an odd-numbered stage gear to the standby mode beforehand and then switching the connection from the first clutch 10 to the second clutch 20 or vice versa. This arrangement minimizes the time required for completing a speed change and also minimizes a shock due to a speed change.

However, the first clutch 10 and the second clutch 20 are subjected to heat load when the switching between the engagement mode and the disengagement mode is repeated. Hence, a sufficient amount of lubricating oil must to be supplied to the clutches.

Figure 2:
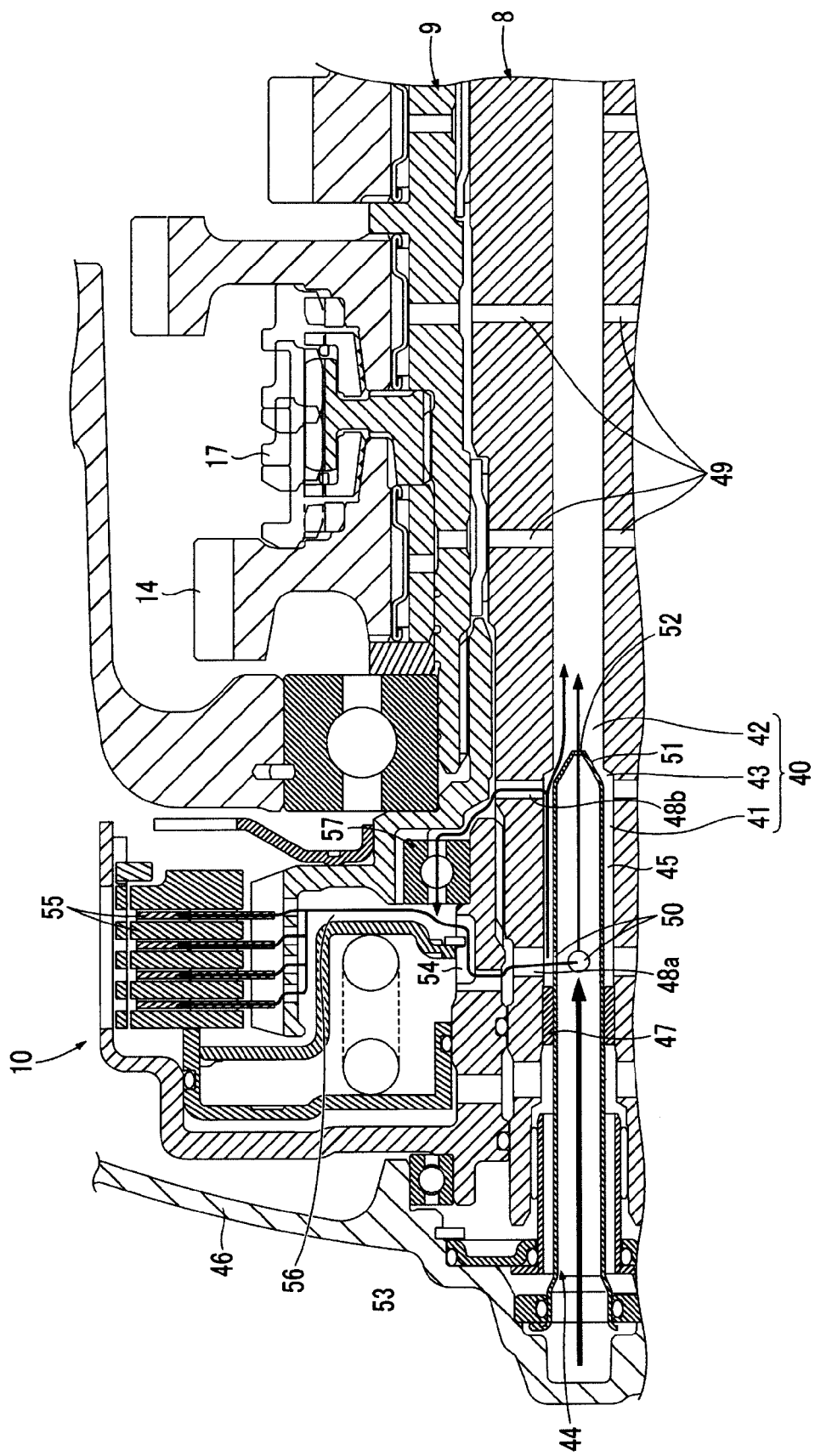
FIG. 2 is a sectional diagram illustrating a lubricating structure in the vicinity of a first input shaft of the transmission in FIG. 1.

FIG. 2 illustrates a lubricating structure in the vicinity of an end of the first input shaft 8, the end being adjacent to the first clutch 10. As illustrated in FIG. 2, the first input shaft 8 has an internal space 40 extending along the rotational axis line thereof. The internal space 40 includes a large-diameter portion 41, which is opened at one end of the first input shaft 8 and which has a predetermined diameter, a small-diameter portion 42, which has a diameter smaller than that of the large-diameter portion 41, and a stepped portion 43 located between the large-diameter portion 41 and the small-diameter portion 42.

A pipe 44 is inserted, distal end first, into the large-diameter portion 41 such that a predetermined gap 45 is formed between the pipe 44 and the inner peripheral surface of the large-diameter portion 41. The proximal end portion of the pipe 44 is secured to a case 46 of the transmission 1. The lubricating oil is supplied into the pipe 44 from the proximal end thereof via an oil passage of the case 46. The end portion of the gap 45 adjacent to the proximal end is defined by a bush seal 47 for separating the oil passage for actuating the first clutch 10 and the gap 45.

The first input shaft 8 has two shaft lubrication holes 48a and 48b serving as first shaft lubrication holes penetrating, in the radial direction of the first input shaft 8, from the large-diameter portion 41 to the outer peripheral surface of the first input shaft 8. The first input shaft 8 also has a plurality of shaft lubrication holes 49 serving as the second shaft lubrication holes penetrating, in the radial direction of the first input shaft 8, from the small-diameter portion 42 to the outer peripheral surface of the first input shaft 8.

The pipe 44 has a first pipe lubrication hole 50 penetrating from the inner peripheral surface thereof to the gap 45 in the radial direction of the pipe 44. The distal end of the pipe 44 has a tapered portion 51, the diameter of which reduces toward the distal end. The distal end of the tapered portion 51 has a second pipe lubrication hole 52 of a diameter smaller than that of the first pipe lubrication hole 50.

The extents of presence of the stepped portion 43 and the tapered portion 51 overlap in the axial line direction. The distal end of the second pipe lubrication hole 52 is positioned in the small-diameter portion 42. The passage from the gap 45 to the small-diameter portion 42 is narrowed by the stepped portion 43 and the tapered portion 51.

The shaft lubrication hole 48a is located at a position corresponding to the first pipe lubrication hole 50. More specifically, the axial line of the shaft lubrication hole 48a is flush with or in the vicinity of the axial line of the first pipe lubrication hole 50. The shaft lubrication hole 48b is positioned closer to the stepped portion 43 than to the shaft lubrication hole 48a, e.g., positioned before the stepped portion 43.

The shaft lubrication hole 48a is in communication with a clutch canceller chamber 53 of the first clutch 10 and further in communication with a space 56, in which there are clutch discs 55, via a leakage groove 54. The leakage groove 54 is provided on the inner peripheral side of the clutch canceller chamber 53 so as not to adversely affect the original function of the clutch canceller chamber 53. The shaft lubrication hole 48b is in communication with the space 56 through the intermediary of a bearing 57 located between the input end and the output end of the first clutch 10.

In the construction, the lubricating oil supplied into the pipe 44 from the proximal end thereof flows into the gap 45 through the first pipe lubrication hole 50 and also flows into the small-diameter portion 42 through the second pipe lubrication hole 52, as indicated by the arrows in FIG. 2. The lubricating oil that has flown into the gap 45 rotates due to the friction against the inner peripheral surface of the large-diameter portion 41 that is rotating, so that a centrifugal force acts on the lubricating oil. The lubricating oil subjected to the centrifugal force successfully flows out through the shaft lubrication holes 48a and 48b to be distributed to the clutch discs 55, the clutch canceller chamber 53 and other mechanisms around the first input shaft 8.

At this time, the lubricating oil that has not flown out of the shaft lubrication hole 48a is restricted in movement in the axial direction by the stepped portion 43, and the passage to the small-diameter portion 42 is narrowed, thus causing the lubricating oil to flow in the gap 45 in a stagnant manner. During this time, the centrifugal force acting on the lubricating oil is further increased due to the friction against the inner peripheral surface of the large-diameter 41 that is rotating. This further accelerates the outflow of the lubricating oil from the shaft lubrication hole 48b.

The lubricating oil that has not flown out of the shaft lubrication holes 48a and 48b flows into the small-diameter portion 42, passing between the inner wall of the stepped portion 43 and the tapered portion 51. The lubricating oil that has flown into the small-diameter portion 42 merges with the lubricating oil that has flown into the small-diameter portion 42 through the second pipe lubrication hole 52. The merged lubricating oil is subjected to the centrifugal force produced by the rotation of the first input shaft 8 and flows out through the shaft lubrication holes 49 to be distributed to the 6th-speed drive gear 14, the 6th-8th speed synchromesh mechanism 17 and other mechanisms around the first input shaft 8.

At this time, the diameter of the second pipe lubrication hole 52 is smaller than the diameter of the first pipe lubrication hole 50, so that the amount of the lubricating oil flowing into the small-diameter portion 42 through the second pipe lubrication hole 52 is relatively small. Further, the diameter of the small-diameter portion 42 is smaller than that of the large-diameter portion 41, so that the centrifugal force acting on the lubricating oil in the small-diameter portion 42 is smaller than that in the large-diameter portion 41.

Hence, the amount of the lubricating oil distributed from the large-diameter portion 41 through the shaft lubrication holes 48a and 48b can be easily increased to be larger than the amount of the lubricating oil distributed through the shaft lubrication hole 49. Further, the ratio between the amount of the lubricating oil supplied through the shaft lubrication holes 48a and 48b and the amount supplied through the shaft lubrication hole 49 can be properly set by selecting the dimensions of the second pipe lubrication hole 52, the stepped portion 43, and the like.

Figure 3:
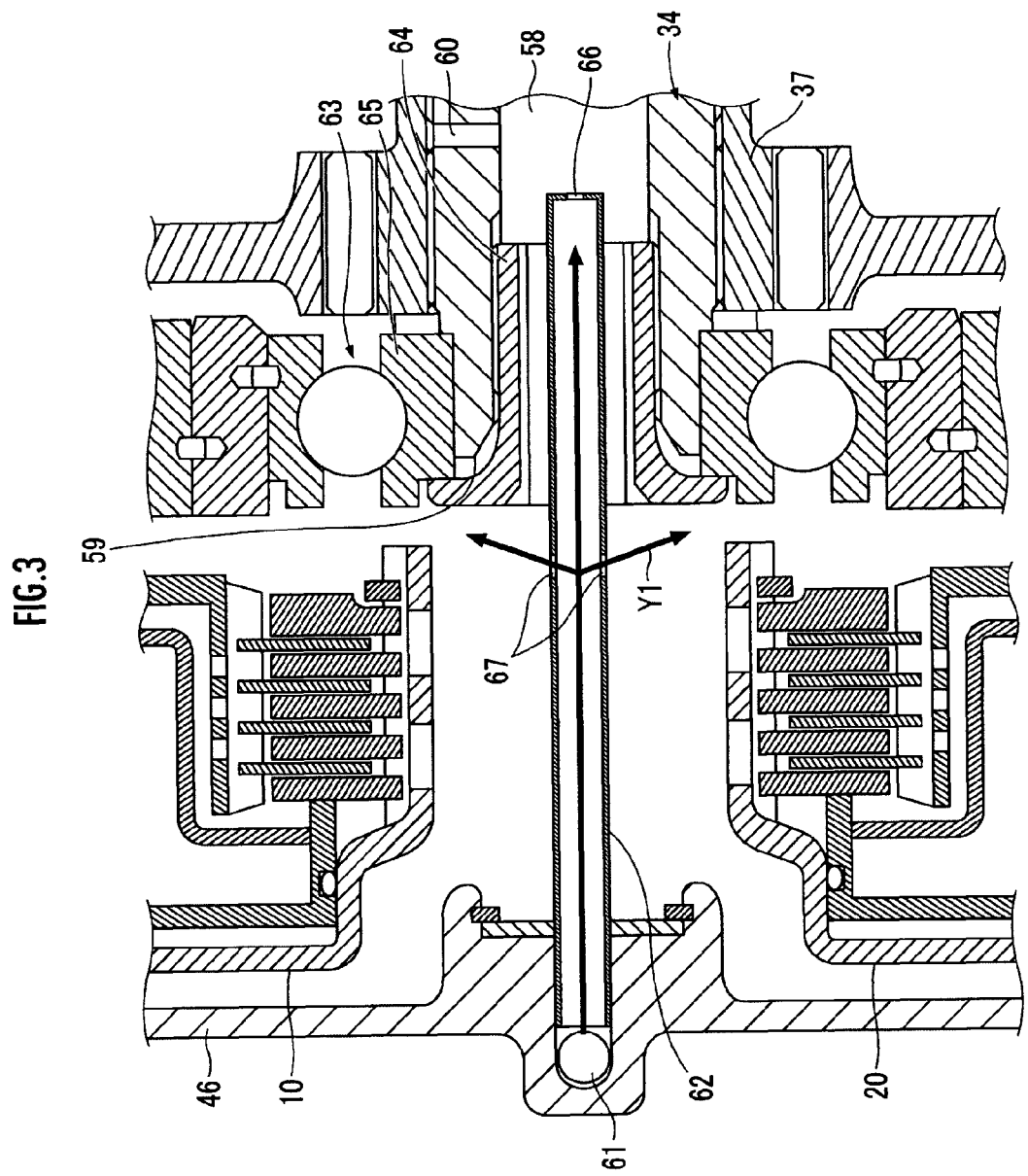
FIG. 3 is a sectional diagram illustrating a lubricating structure in the vicinity of an end portion of an output shaft in the transmission in FIG. 1.

FIG. 3 illustrates a lubricating structure in the vicinity of an end portion of the output shaft 34, the end portion being adjacent to the 5th speed/6th-speed driven gear 37. As illustrated in FIG. 3, the output shaft 34 has a cylindrical internal space constituting an in-shaft oil passage 58 that extends in the direction of the length of the output shaft 34. One end of the internal space opens at the end surface of the output shaft 34, which end surface is adjacent to the 5th speed/6th-speed driven gear 37, constituting an opening end 59 of the output shaft 34.

Further, the output shaft 34 is provided with a plurality of in-shaft lubrication holes 60 extending from the in-shaft oil passage 58 to the outer peripheral surface of the output shaft 34 to distribute the lubricating oil to the gears, such as the 5th speed/6th-speed driven gear 37, around the output shaft 34. The case 46 of the transmission 1 is provided with an oil distribution pipe 62 for supplying the lubricating oil to the in-shaft oil passage 58 from an oil passage 61 of the case 46. The axial lines of the output shaft 34, the in-shaft oil passage 58, and the oil distribution pipe 62 coincide.

The output shaft 34 is rotatably supported by a ball bearing 63 provided on the outer periphery of the end portion thereof adjacent to the opening end 59. The distal end of a hollow cylindrical member 64, which has both ends opened and has a flanged portion at the proximal end thereof, is fitted and fixed to the inner periphery of the end portion of the output shaft 34, the end portion being adjacent to the opening end 59. The distal end surface of the cylindrical member 64 defines the end edge of the in-shaft oil passage 58, which end edge is adjacent to the opening end 59.

An inner race 65 of the ball bearing 63 is fitted to the outer side of a small-diameter portion via the step of the outer periphery of the end portion of the output shaft 34, the end portion being adjacent to the opening end 59, and fixed in the fitting direction by the flanged portion of the cylindrical member 64.

The proximal portion of the oil distribution pipe 62 is fixed to the case 46 and connected to the oil passage 61 provided in the case 46. A part of the oil distribution pipe 62 at the distal end thereof passes the inner side of the cylindrical member 64 and the distal end portion thereof juts out of the distal end of the cylindrical member 64, reaching the in-shaft oil passage 58 of the output shaft 34. The distal end of the oil distribution pipe 62 is partly closed. More specifically, the distal end is closed except for a central small-diameter lubrication hole 66 having a diameter that is smaller than the inside diameter of the oil distribution pipe 62.

A number of slanting lubrication holes 67 are evenly provided in the circumferential direction in a portion of the oil distribution pipe 62 at a distance slightly away from the cylindrical member 64 toward the proximal end of the oil distribution pipe 62. The slanting lubrication holes 67 are oriented toward the ball bearing 63. More specifically, the axial lines of the slanting lubrication holes 67 and the axial line of the oil distribution pipe 62 cross each other, and the direction of the ball bearing 63 and the direction of the small-diameter lubrication hole 66 observed from the crossing point form a predetermined acute angle.

In the configuration described above, when the lubricating oil is supplied from the oil passage 61 to the proximal end of the oil distribution pipe 62, the lubricating oil accumulates in the oil distribution pipe 62 with a resultant increased pressure of the lubricating oil, since the distal end of the oil distribution pipe 62 is narrowed to the diameter of the small-diameter lubrication hole 66. This causes the lubricating oil to be emitted toward the ball bearing 63 through the slanting lubrication holes 67, as indicated by arrows Y1 in FIG. 3.

The emitted lubricating oil reaches the balls of the ball bearing 63 via the space defined by the first clutch 10 and the second clutch 20, the flange of the cylindrical member 64, the inner race 65 and the like. Thus, the ball bearing 63 is lubricated well.

Meanwhile, a part of the lubricating oil stagnant in the oil distribution pipe 62 flows into the in-shaft oil passage 58 through the small-diameter lubrication hole 66 at the distal end of the oil distribution pipe 62. As the output shaft 34 rotates, a centrifugal force is imparted to the lubricating oil that has flown, causing the lubricating oil to smoothly flow out of the in-shaft lubrication holes 60. The lubricating oil that has flown out is used to lubricate the 5th speed/6th-speed driven gear 37 and the like around the output shaft 34.

Figure 4:
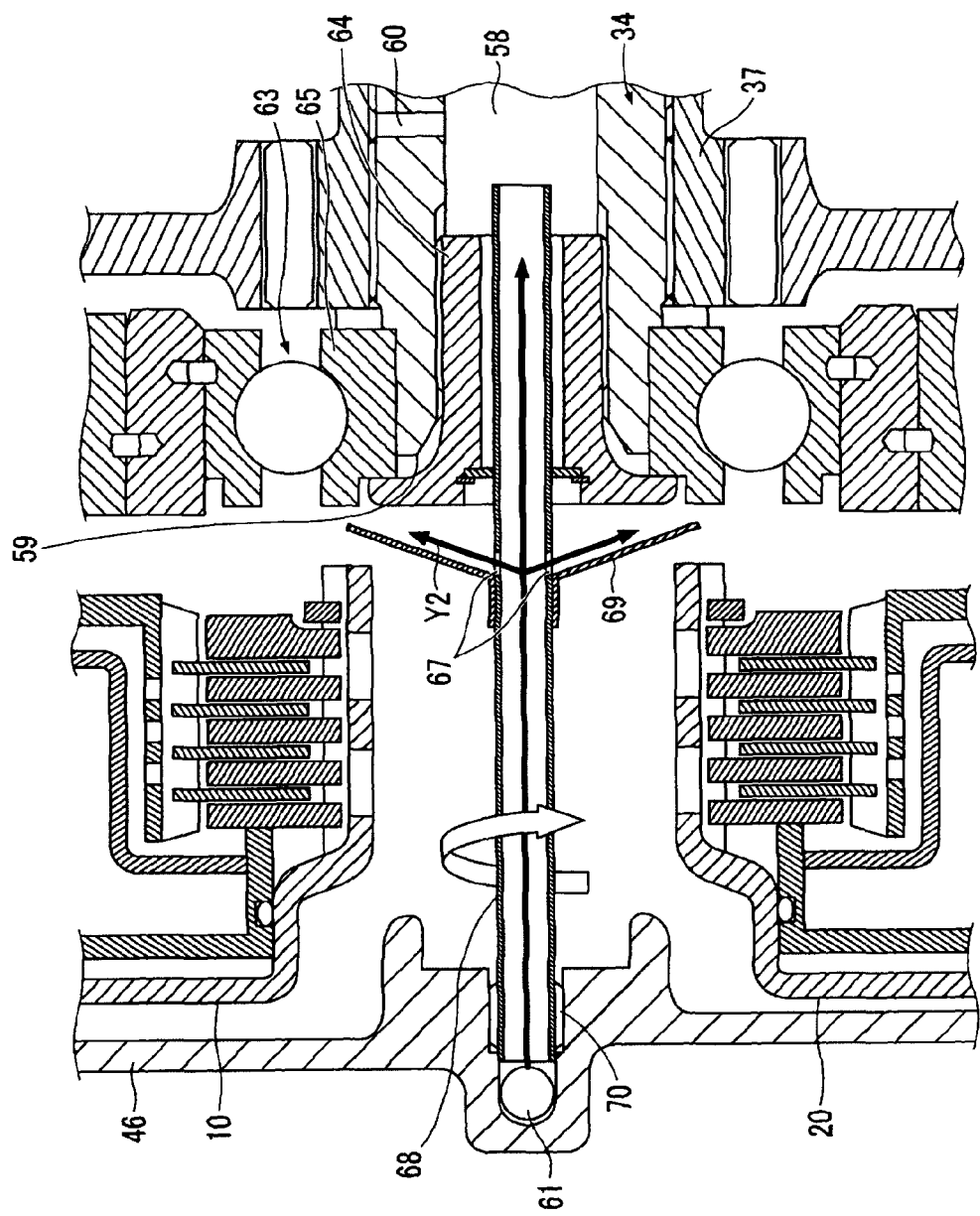
FIG. 4 is a sectional diagram illustrating another lubricating structure in the vicinity of an end portion of an output shaft in the transmission in FIG. 1.

FIG. 4 illustrates another example of the lubricating structure of a section similar to that illustrated in FIG. 3. This example differs from the case of the aforesaid oil distribution pipe 62 in the configuration and the supporting method of an oil distribution pipe for supplying lubricating oil to a ball bearing 63 and an in-shaft oil passage 58.

More specifically, the distal end of an oil distribution pipe 68 related to the example illustrated in FIG. 4 is opened in the in-shaft oil passage 58 rather than being partly closed, and the diameter of the opening is the same as the inside diameter of the oil distribution pipe 68. The proximal end of the oil distribution pipe 68 is rotatably supported by a case 46 through the intermediary of a bush 70 and connected to an oil passage 61 in the case 46. The distal end of the oil distribution pipe 68 is secured to a cylindrical member 64 at the portion adjacent to the cylindrical member 64.

Further, a guide member 69 shaped like a truncated cone as observed sideways is provided on the outer periphery of a portion of the oil distribution pipe 68, which portion is adjacent to the proximal end relative to the slanting lubrication holes 67. The generatrix of the truncated cone shape faces the ball bearing 63. This means that the guide member 69 guides the lubricating oil, which comes out of the slanting lubrication holes 67, toward the ball bearing 63. The rest of the lubricating structure illustrated in FIG. 4 is the same as the lubricating structure illustrated in FIG. 3.

In the lubricating structure shown in FIG. 4, when the output shaft 34 rotates, the oil distribution pipe 68 fixed to the output shaft 34 through the cylindrical member 64 also rotates integrally with the output shaft 34. At this time, when the lubricating oil is supplied to the proximal end portion of the oil distribution pipe 68 from the oil passage 61 of the case 46, the lubricating oil is subjected to the centrifugal force attributable to the rotation of the oil distribution pipe 68 while the lubricating oil flows in the oil distribution pipe 68 toward the distal end thereof.

Then, when reaching the positions of the slanting lubrication holes 67, the lubricating oil flows out of the slanting lubrication holes 67 due to the centrifugal force, as indicated by arrow Y2 in FIG. 4. The lubricating oil is further guided by the guide member 69 toward the ball bearing 63 while subjected to a further increased centrifugal force, eventually lubricating the ball bearing 63.

Meanwhile, the lubricating oil that has not flown out of the slanting lubrication holes 67 flows into the in-shaft oil passage 58 from the distal end of the oil distribution pipe 68. The lubricating oil that has flown in is distributed to lubricate the 5th speed/6th-speed driven gear 37 and the like, as with the case of the lubricating structure illustrated in FIG. 3.

Thus, according to the present embodiment, in the lubricating structure in the vicinity of the first input shaft 8, the lubricating oil is flown out into the gap 45 through the first pipe lubrication hole 50 of the pipe 44 inserted into the first input shaft 8, and distributed to the first clutch 10 via the shaft lubrication holes 48a and 48b from the gap 45. This arrangement makes it possible to supply more lubricating oil in an appropriate amount to the first clutch 10 than that supplied to the remaining mechanisms.

Further, the distal end portion of the pipe 44 is shaped into the tapered portion 51, and the ranges of presence of the stepped portion 43 and the tapered portion 51 in the axial line direction are adapted to overlap, thus making it possible to accurately narrow the passage from the gap 45 to the small-diameter portion 42 by the stepped portion 43 and the tapered portion 51 and to achieve an optimum distribution ratio of the lubricating oil between the first clutch 10 and the remaining mechanisms.

In addition, the shaft lubrication hole 48a located at the position corresponding to the first pipe lubrication hole 50 and the shaft lubrication hole 48b located closer to the stepped portion 43 than the shaft lubrication hole 48a are provided as the first shaft lubrication holes, thus making it possible to effectively increase the amount of the lubricating oil supplied to the first clutch 10. Further, the distal end of the second pipe lubrication hole 52 is positioned in the small-diameter portion 42, allowing the lubricating oil to be securely supplied into the small-diameter portion 42 from the distal end of the second pipe lubrication hole 52.

The lubricating structure in the vicinity of the end portion of the output shaft 34 uses the oil distribution pipe 62 or 68, so that a sufficient amount of lubricating oil can be directly supplied to the ball bearing 63, which supports the output shaft 34, while properly distributing the lubricating oil to the gears and the like around the output shaft 34.

The present invention is not limited to the embodiments described above. For example, although the descriptions have been given of the cases where the present invention has been applied to the first input shaft 8 in the twin-clutch type transmission 1, the present invention is not limited thereto. The present invention can be generally applied to cases where lubricating oil is supplied to the mechanisms about a shaft, which rotates in a transmission, via a space in the shaft. Further, the present invention allows more lubricating oil to be supplied to the vicinity of one end of the shaft than that supplied to the remaining mechanisms.

What is claimed is:

1. A lubricating structure of a transmission comprising:
   a shaft which rotates in a transmission; and
   a pipe which has a proximal end portion thereof secured to a case of the transmission and through which lubricating oil is supplied from a proximal end thereof,
   wherein the shaft has an internal space which extends along a rotational axis line thereof,
   the internal space has a large-diameter portion of a predetermined diameter which opens at one end of the shaft, a small-diameter portion having a diameter which is smaller than that of the large-diameter portion, and a stepped portion between the large-diameter portion and the small-diameter portion,
   the pipe is inserted into the large-diameter portion such that a predetermined gap is formed between the pipe and an internal peripheral surface of the large-diameter portion,
   the shaft has a first shaft lubrication hole penetrating from the large-diameter portion to an outer peripheral surface of the shaft and a second shaft lubrication hole penetrating from the small-diameter portion to the outer peripheral surface of the shaft,
   the pipe has a first pipe lubrication hole penetrating from an inner peripheral surface thereof to the gap,
   a distal end of the pipe has a second pipe lubrication hole of a diameter which is smaller than the diameter of the first pipe lubrication hole, and a passage from the gap to the small-diameter portion is narrowed by a distal end portion of the pipe and the stepped portion.

2. The lubricating structure of the transmission according to claim 1, wherein a distal end of the pipe has a tapered portion, a diameter of which reduces toward the distal end, and ranges of presence of the stepped portion and the tapered portion in an axial line direction overlap.

3. The lubricating structure of the transmission according to claim 1, wherein the first shaft lubrication hole comprises a lubrication hole located at a position corresponding to the first pipe lubrication hole and a lubrication hole located at a position closer to the stepped portion than the lubrication hole located at the position corresponding to the first pipe lubrication hole.

4. The lubricating structure of the transmission according to claim 1, wherein the first shaft lubrication hole is provided to supply lubricating oil to a clutch of the transmission, and a distal end of the second pipe lubrication hole is positioned in the small-diameter portion.

\* \* \* \* \*